April 21, 1959 W. B. FAHRENBACH 2,882,657
BANDING APPARATUS AND METHOD
Filed April 8, 1957 14 Sheets-Sheet 1
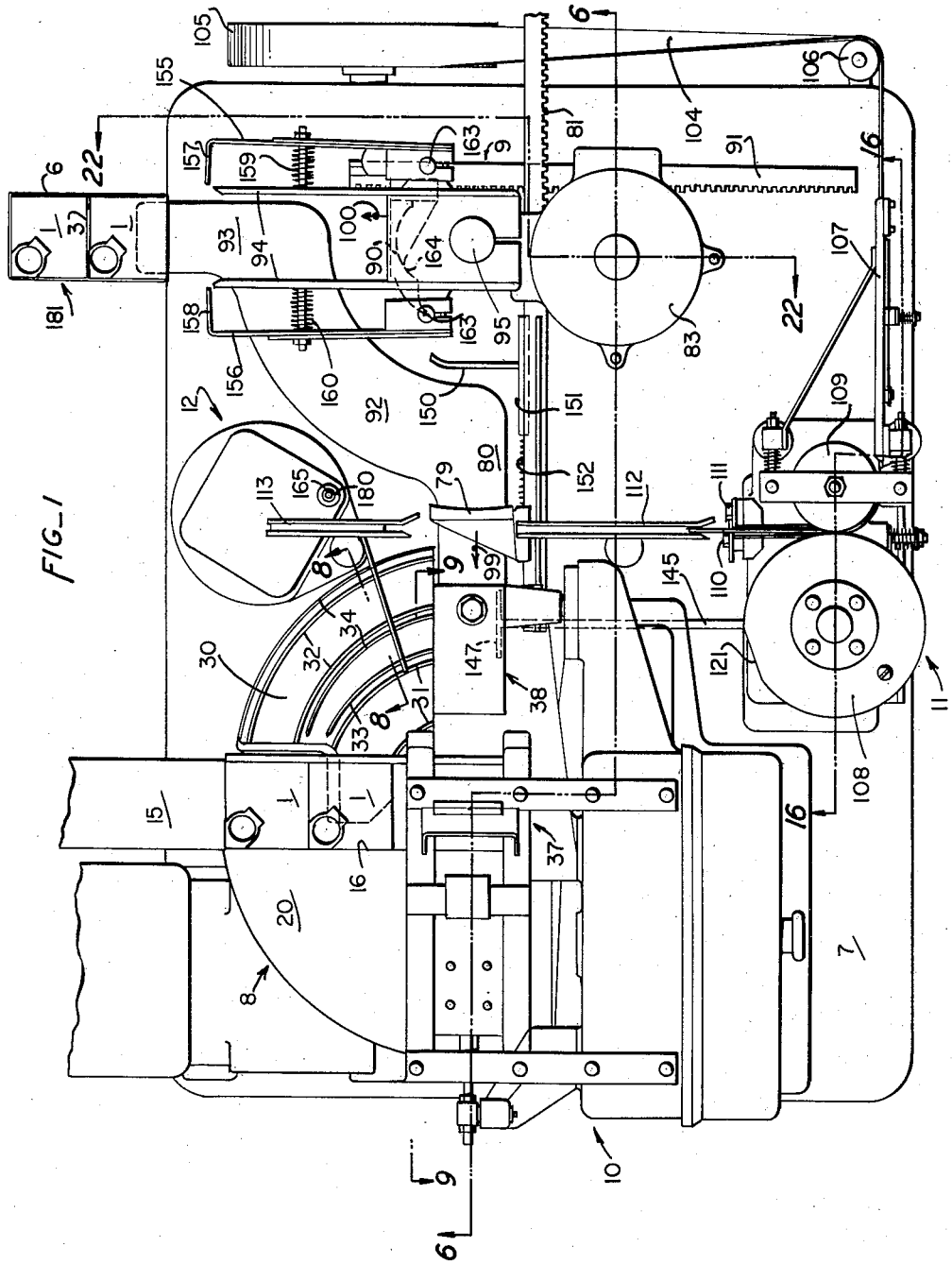
INVENTOR.
WOLFGANG B. FAHRENBACH
BY
Boyken, Mohler & Wood
ATTORNEYS

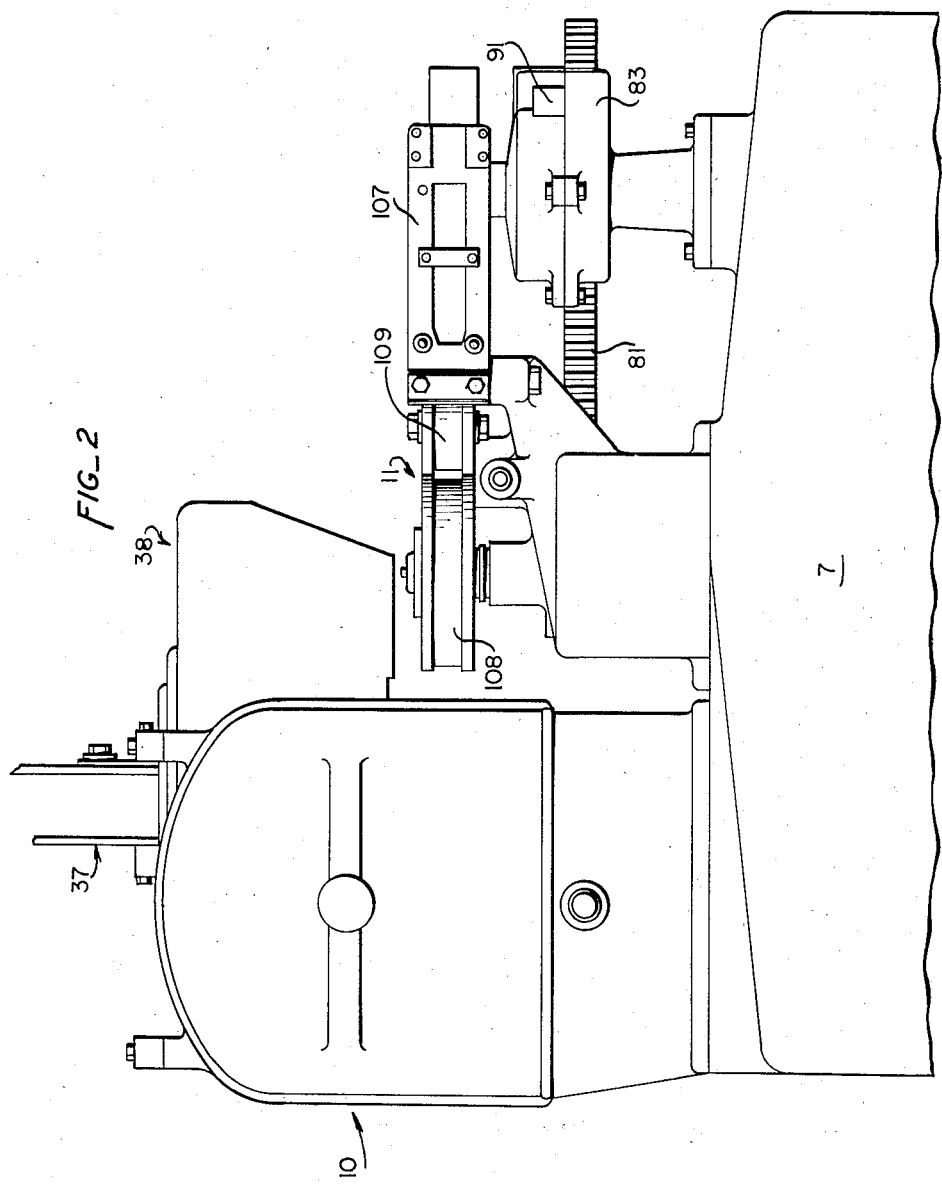

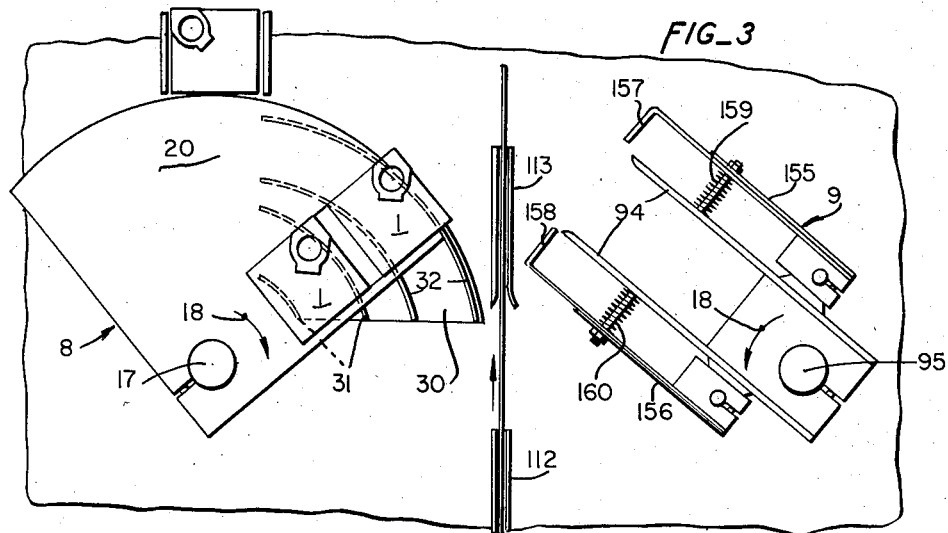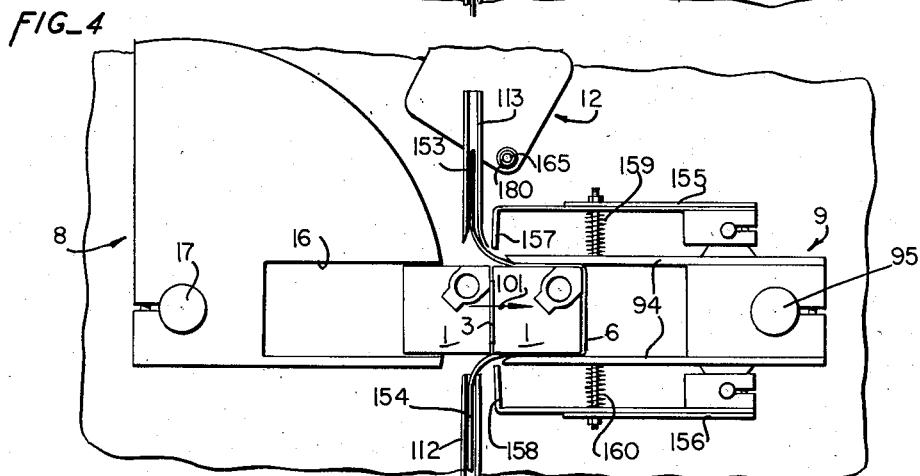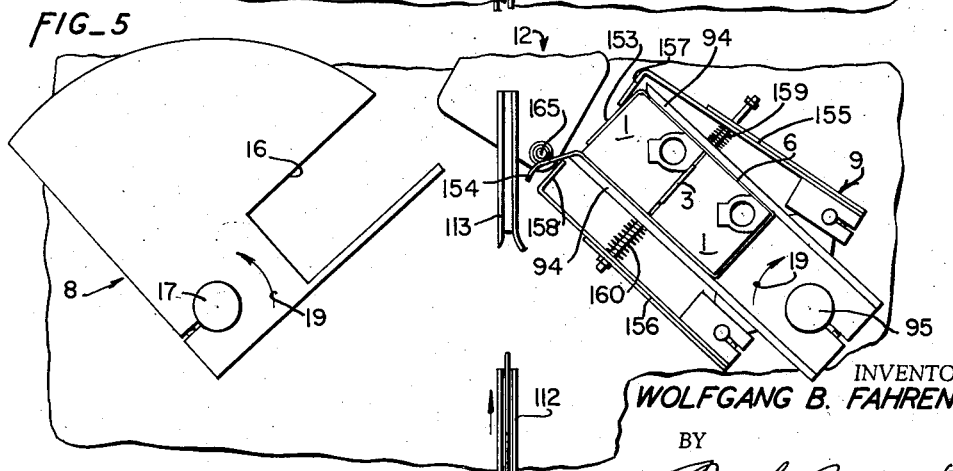

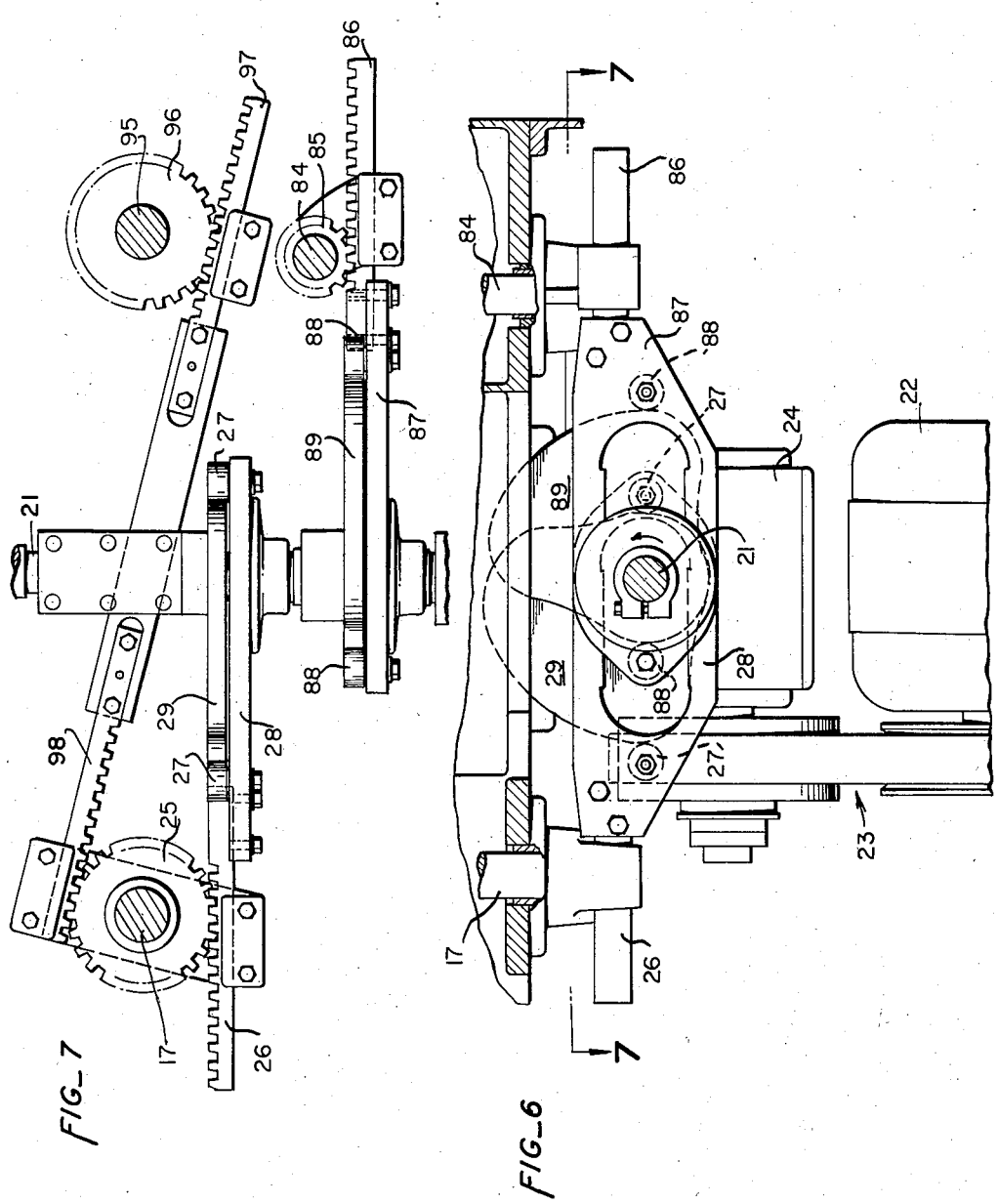

April 21, 1959
W. B. FAHRENBACH
2,882,657
BANDING APPARATUS AND METHOD
Filed April 8, 1957
14 Sheets-Sheet 5
FIG_ 9
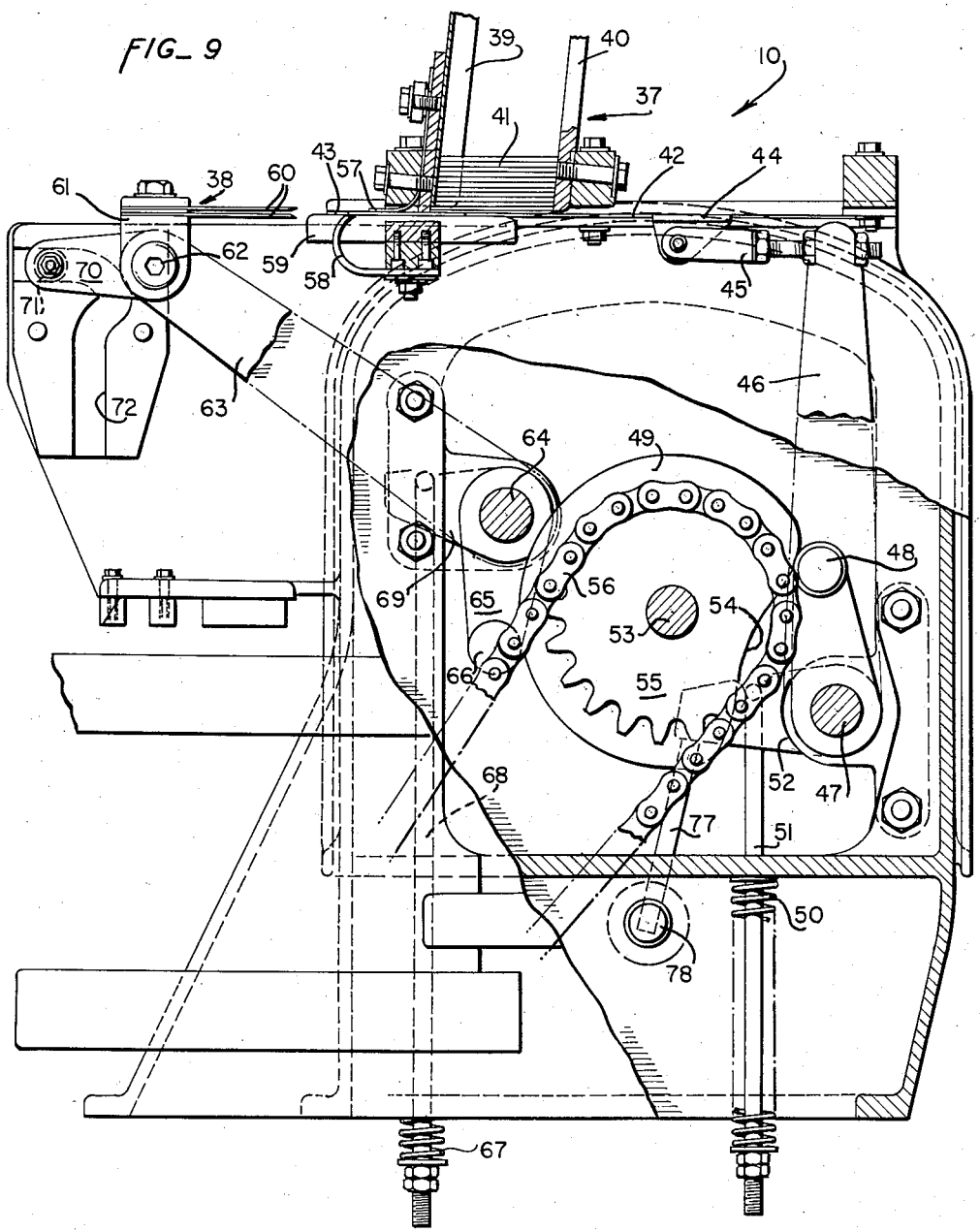
INVENTOR.
WOLFGANG B. FAHRENBACH
BY
ATTORNEYS

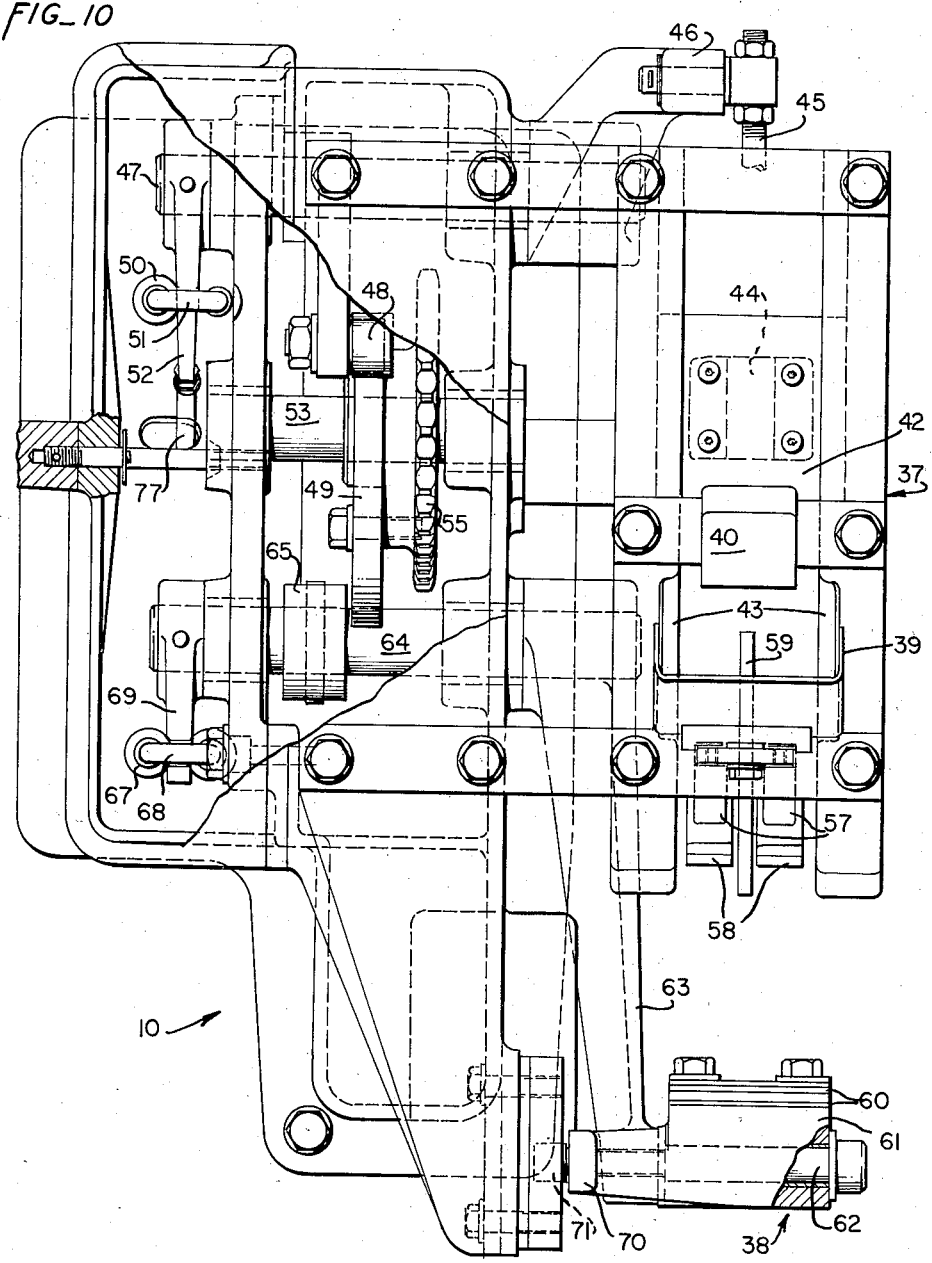

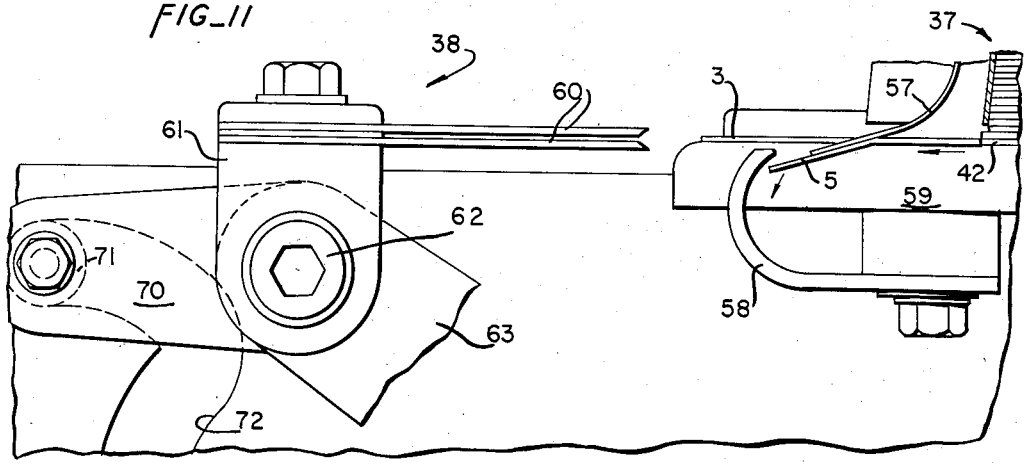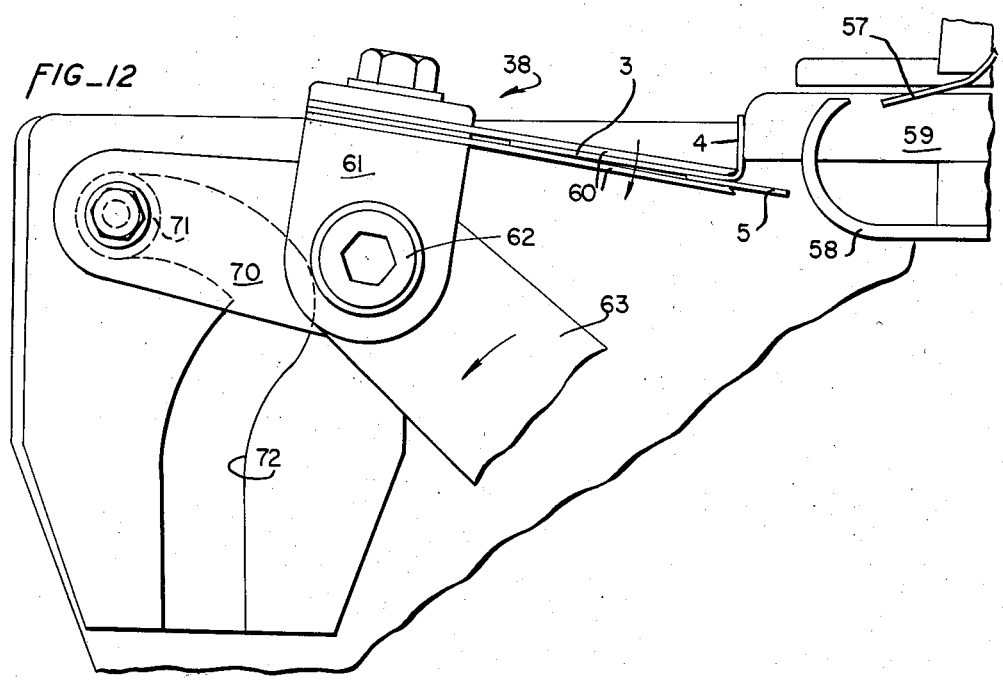

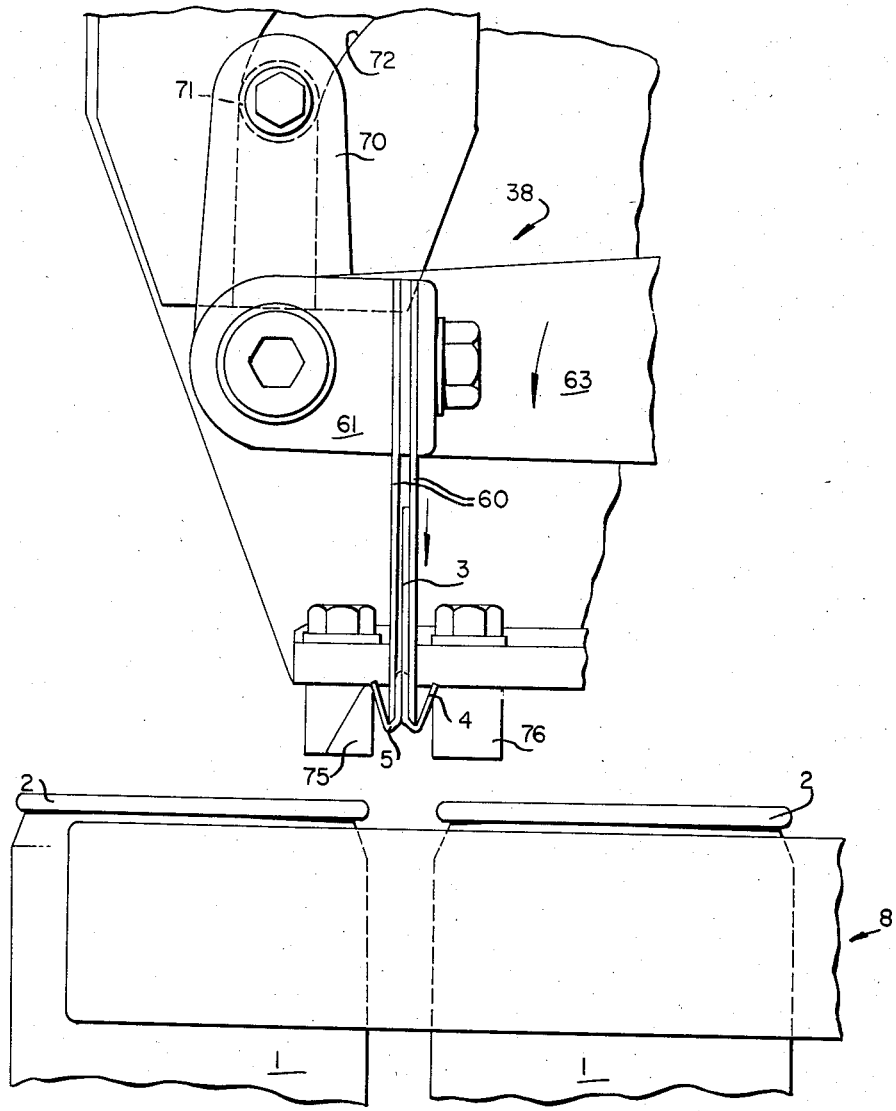

April 21, 1959 W. B. FAHRENBACH 2,882,657
BANDING APPARATUS AND METHOD
Filed April 8, 1957 14 Sheets-Sheet 9
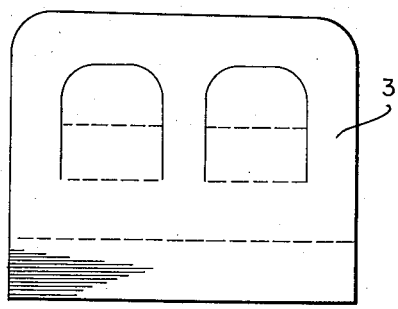
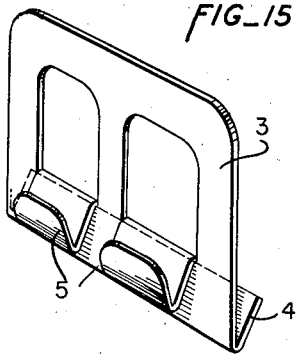
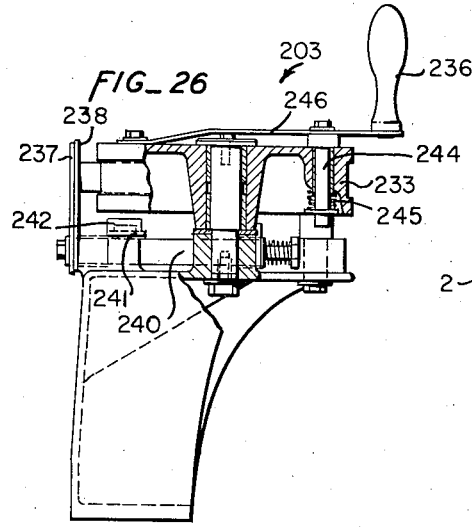
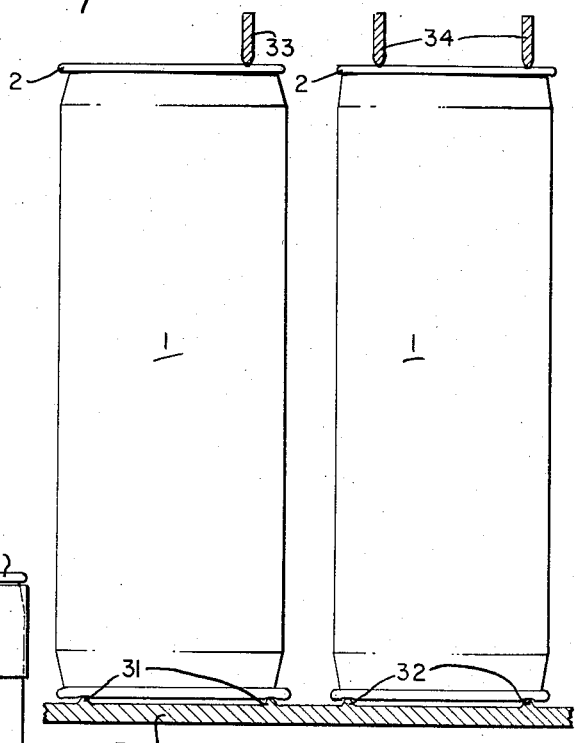
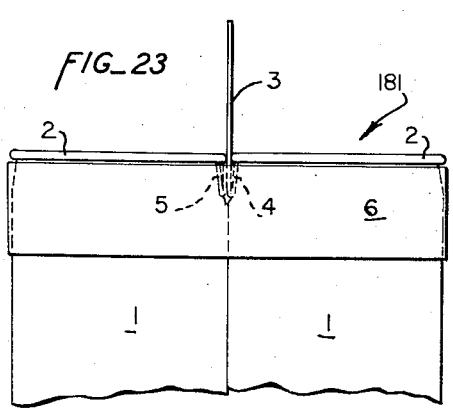
INVENTOR.
WOLFGANG B. FAHRENBACH
BY
ATTORNEYS

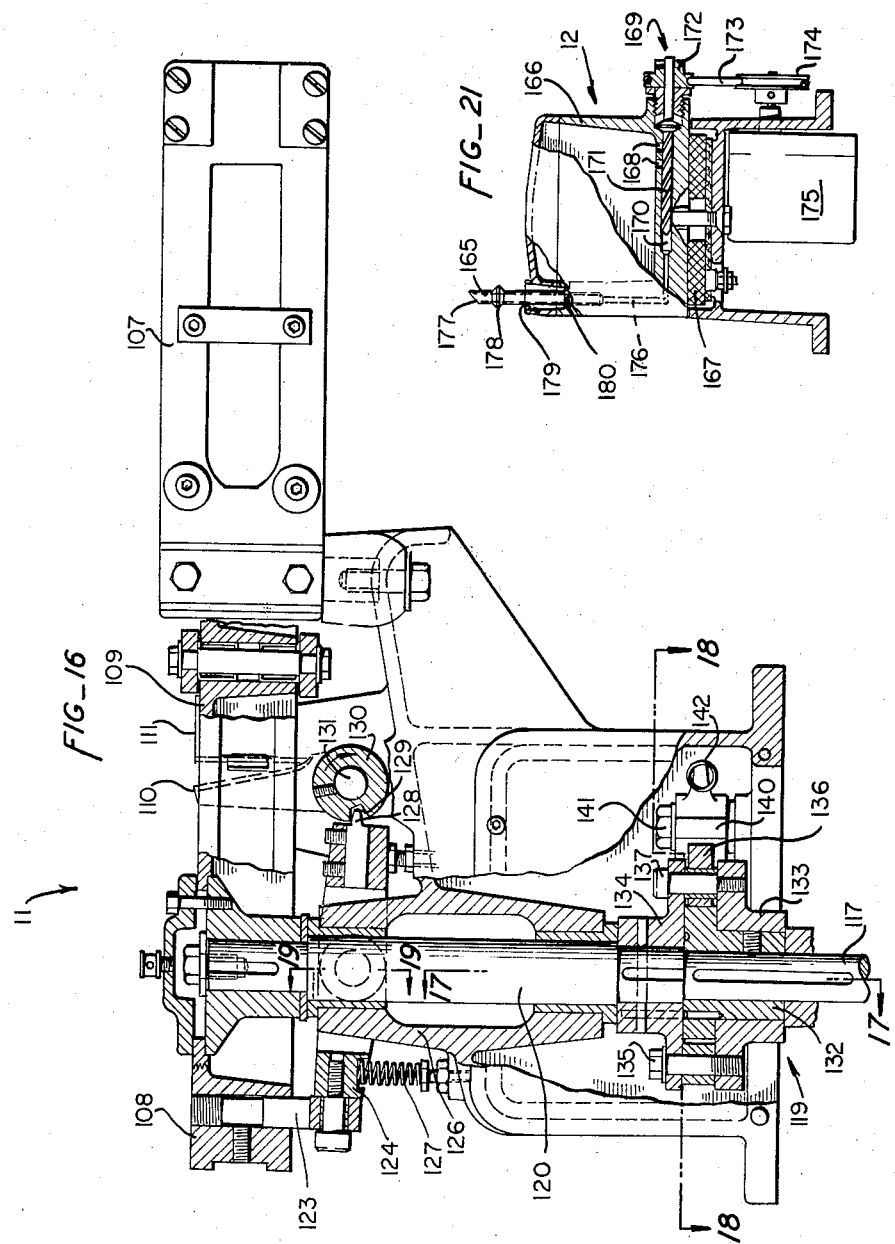

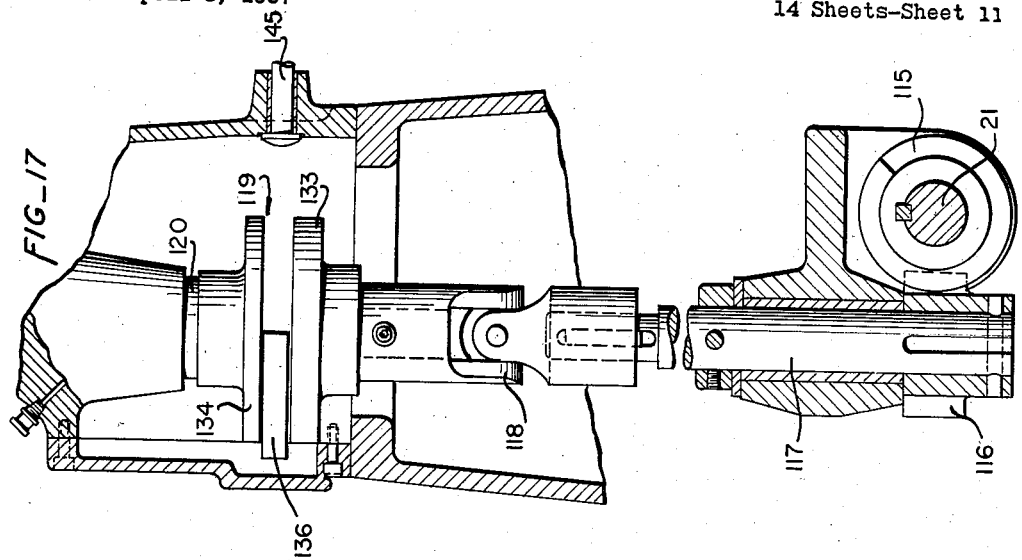
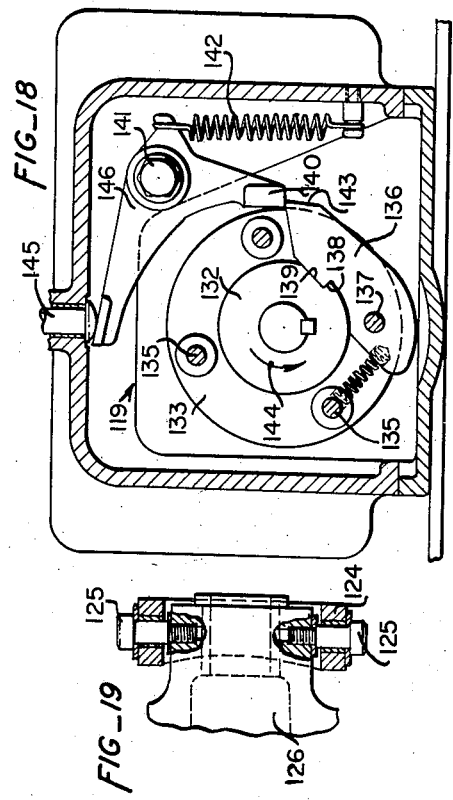
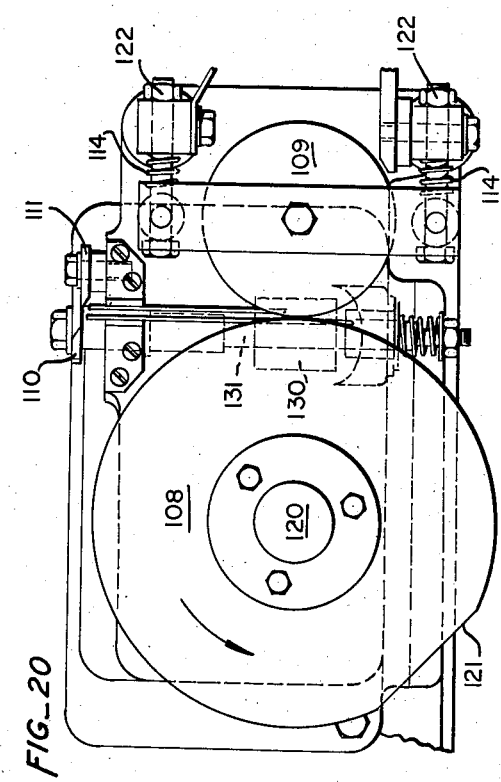
INVENTOR.
WOLFGANG B. FAHRENBACH
BY
Buykus, Mohler & Wood
ATTORNEYS

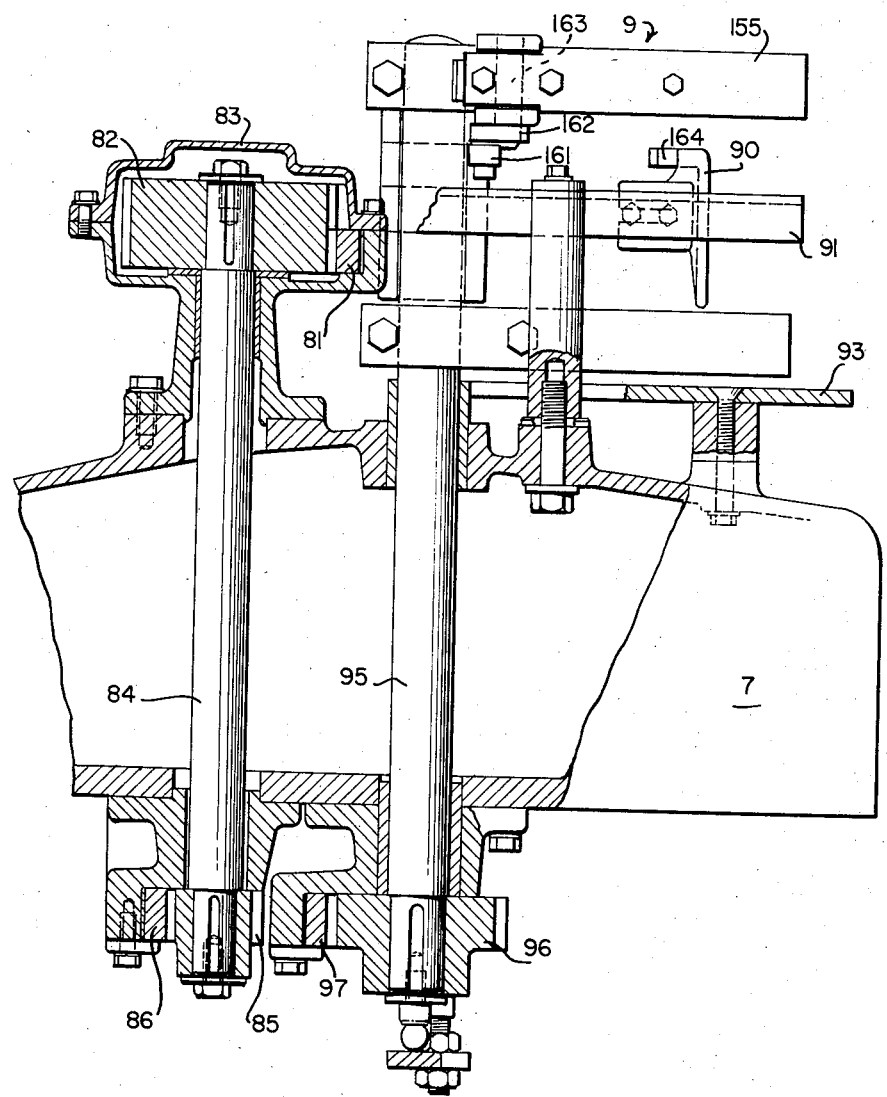

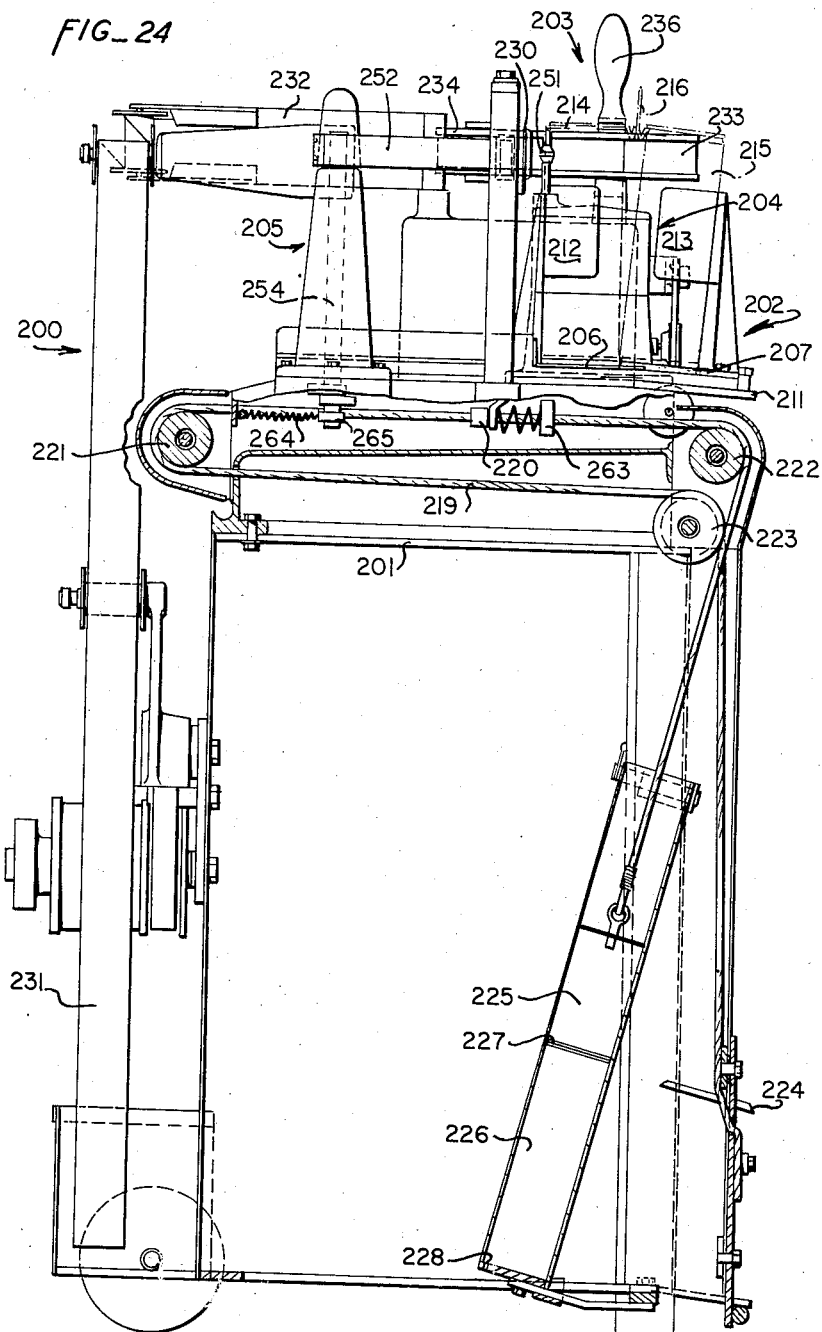

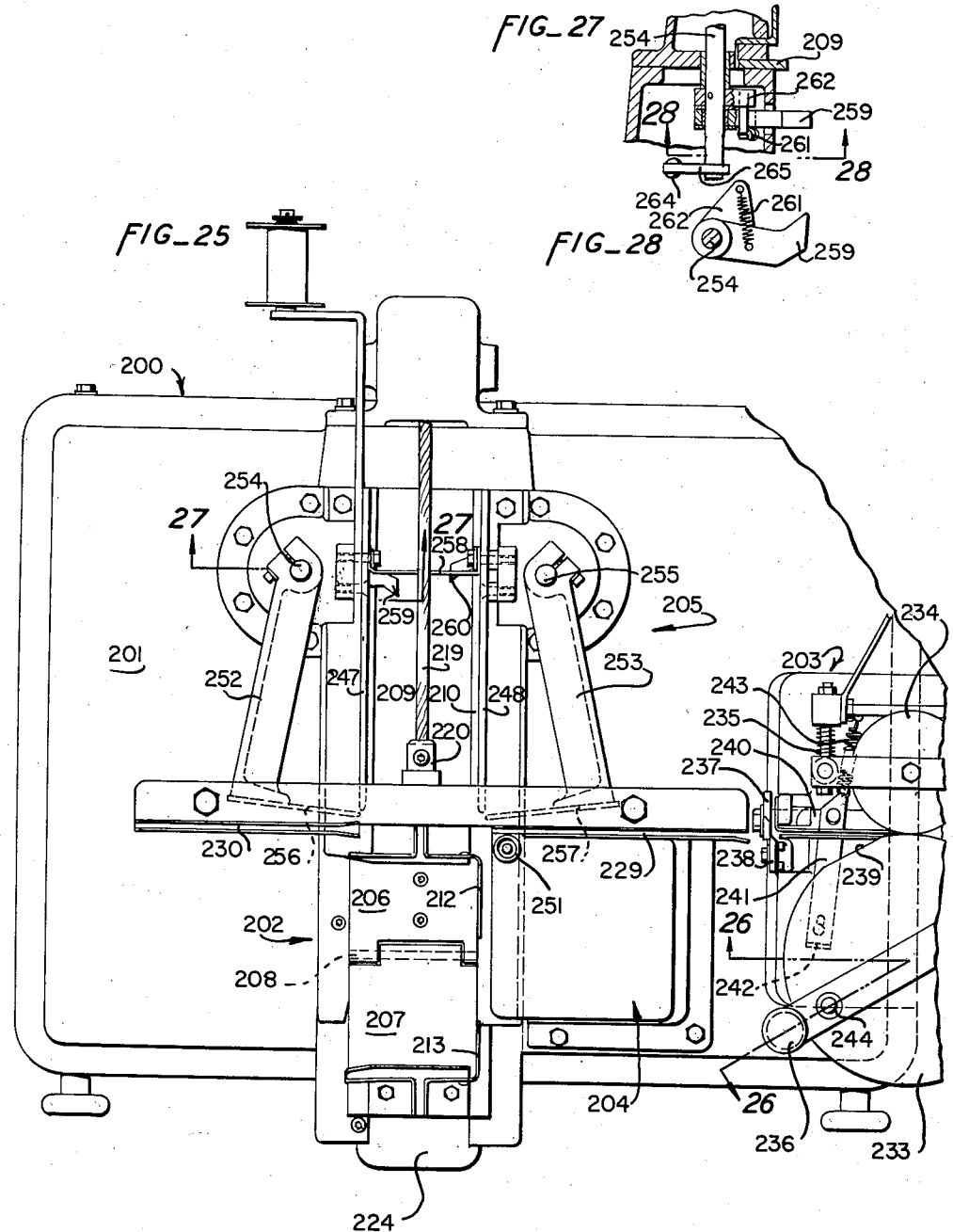

ated Apr. 21, 1959

2,882,657

BANDING APPARATUS AND METHOD

Wolfgang B. Fahrenbach, Oakland, Calif., assignor to Edlo, Inc.

Application April 8, 1957, Serial No. 651,416

7 Claims. (Cl. 53—3)

This invention relates to apparatus for applying a carrier to a pair of cartons and methods of packaging such cartons for carrying as a unit.

In Patent No. 2,766,567, issued October 16, 1956, and copending application, Serial No. 462,347, filed October 14, 1954, by the same inventor, apparatus of this general type is disclosed in which a carrier is formed for a pair of upright, rectangular, filled milk cartons. The carrier, which this apparatus applies to the cartons comprises a handle, the lower portion of which is positioned between the cartons, and a band secured around the pair of cartons to package them together and to hold the handle in place.

The apparatus and methods disclosed herein are in the nature of improvements on the aforementioned subject matter. It is important that machines of this type operate rapidly and continuously in order to keep up with high speed carton filling machinery and at the same time simplicity of action and maintenance are necessary characteristics to prevent interruption of the line of operations. Since various steps are performed in the assembly of the cartons, handle, and band, this invention concerns itself with the simplification of these steps as wall as of the apparatus which performs the steps.

It is therefore an object of this invention to provide a novel and expedient method of assembling a pair of cartons into a unit with a carrying handle and apparatus for performing said method.

Another object of this invention is the provision of means for separating a pair of cartons for inserting a handle therebetween.

Still another object of this invention is the provision of an improved method and means for securing an elongated band around an article.

It is yet another object of this invention to provide novel adhesive applying means for use in a banding machine.

A further object of this invention is the provision of means for positioning bands for subsequent wrapping about an article including means for automatically cutting said band to length from a strip of banding material.

A still further object of this invention is the provision of simple and rapidly operating means for performing various steps in the formation and application of a band and handle carrier to a pair of upright, rectangular cartons.

Other objects and advantages will become apparent from the following description taken in connection with the accompanying drawings, in which:

Fig. 1 is a top plan view of one form of the machine of this invention;

Fig. 2 is a side elevational view of the machine of Fig. 1;

Figs. 3, 4, and 5 are enlarged, simplified top plan views, similar to Fig. 1, illustrating the parts of the machine in different positions performing sequential steps in assembling a pair of cartons with a band and handle;

Fig. 6 is a sectional view taken generally along line 6—6 of Fig. 1, showing the turret and pusher drive mechanism with the cams rotated 180° from the position of Fig. 1;

Fig. 7 is a top plan view of the main shaft and turret drive mechanism, as seen from line 7—7 of Fig. 6;

Fig. 8 is a sectional view taken generally along line 8—8 of Fig. 1, showing the cartons being separated preparatory to insertion of the handle therebetween;

Fig. 9 is an enlarged side elevational view of the handle folding and inserting mechanism as seen generally from line 9—9 of Fig. 1, partly broken away to show details;

Fig. 10 is a top plan view of the mechanism of Fig. 9 in a different position;

Figs. 11, 12, and 13 are greatly enlarged side elevational views of a portion of the mechanism of Fig. 9 shown in various positions performing sequential steps in forming and inserting the handle;

Fig. 14 is a plan view of a handle blank;

Fig. 15 is a perspective view of a handle formed from the blank of Fig. 14;

Fig. 16 is an enlarged sectional view, taken generally along line 16—16 of Fig. 1, of the band feeding and cutting mechanism;

Fig. 17 is a sectional view taken along line 17—17 of Fig. 16;

Fig. 18 is a sectional view taken along line 18—18 of Fig. 16;

Fig. 19 is a sectional view taken along line 19—19 of Fig. 16;

Fig. 20 is an enlarged top plan view of the band feeding and cutting mechanism of Fig. 1;

Fig. 21 is a side elevational view of the glue applying apparatus of the machine of Fig. 1, partly broken away to show details;

Fig. 22 is an enlarged sectional view, taken along line 22—22 of Fig. 1, of one of the turrets;

Fig. 23 is a side elevational view of the upper ends of a pair of assembled cartons;

Fig. 24 is a side elevational view of another form of the machine of this invention, partly broken away to show internal details;

Fig. 25 is a top plan view of the machine of Fig. 24;

Fig. 26 is a sectional view, taken generally along line 26—26 of Fig. 25, of the band feeding and cutting mechanism;

Fig. 27 is a sectional view taken along line 27—27 of Fig. 25; and,

Fig. 28 is a partial sectional view as seen from line 28—28 of Fig. 27.

This invention is for use with rectangular, cardboard, fluid, filled cartons 1 (Fig. 8), which are flat on both ends and are provided with a projecting flange 2 around the upper end thereof. These cartons are adapted to be packaged in pairs, as disclosed in copending application Serial No. 553,998, filed December 19, 1955, by the present inventor, now U.S. Patent No. 2,835,382, for carrying as a unit. This invention therefore, contemplates that a pair of the cartons 1 will be assembled with a handle 3, of the type shown in Figs. 14, 15, which is inserted between the cartons 1 and is provided with a pair of opposed tabs 4, 5 for engaging under the opposed flanges 2 of the cartons. The cartons are held together against the handle 3 by a collar 6 (Fig. 23) or band which is secured around the upper ends of the cartons.

In general, the method of packaging the cartons as a unit is best described with reference to Figs. 1, 3, 4, 5. From a position in which they are in side by side engaging relation, a pair of the upright cartons 1 are moved along a first path of travel and at the same time are separated (Fig. 3) to provide a space therebetween.

Once separated, the handle 3 is inserted between the upper ends of the cartons (Fig. 13) and the cartons are then moved along a second path of travel (Fig. 4) in tandem relationship. During this movement along the second path of travel the trailing carton is first urged toward the leading carton so as to engage and hold the handle 3 therebetween.

During this same movement the pair of cartons is urged across the band or collar 6 which is supported by its free ends near the upper ends of the cartons 1 (Fig. 4). The band is thereby wrapped around the upper ends of the cartons on three sides.

During the movement of the cartons in side by side relationship along a third path of travel (Fig. 5), the free ends of the band are overlapped on the fourth side of the pair of cartons and secured in place by means of gluing or the like. This completes the unitization of the pair of cartons, which are then ready for discharge (Fig. 1).

It will be obvious from the following description that this general method of assembly of the cartons may be handled by apparatus of different degrees of complexity. The following disclosed forms of apparatus include both an automatic machine in which the cartons are merely fed into and discharged from the machine, and a semi-automatic machine in which some of the steps of assembling the carton package are performed by hand.

The automatic machine, illustrated generally in Figs. 1 and 2, comprises a main housing 7 which contains and supports the majority of the drive mechanisms. Mounted on top of housing 7 are, in general, the operating mechanisms which perform the various steps in assembling the cartons. Included among these are incoming and outgoing turrets, generally designated 8, 9, respectively, the handle feed mechanism 10, the band feeding device 11, and the gluing apparatus 12.

The cartons are fed into the machine in single file on a platform 15 (Fig. 1) by a continuously driven belt or the like (not shown) and are received in pairs in an open ended slot 16 (Figs. 4, 5) in incoming turret 8. Turret 8 is mounted on a vertically journalled shaft 17 and is adapted to swing back and forth in the directions of arrows 18, 19 of Figs. 3, 5 respectively, about the axis of said shaft. Adjacent one side of the slot 16 turret 8 is provided with a solid quadrant 20 which acts as a stop member preventing the ingress of cartons from the platform 15 when the turret is swung away from the intake position of Fig. 1 to a position in which the slot 16 is not aligned with the platform 15 as shown in Fig. 3.

The drive mechanism for turret 8 is illustrated in Figs. 6, 7. A main driving shaft 21 is journalled generally centrally of main housing 7 between turrets 8 and 9 and is driven by a motor 22 (Fig. 6) connected through belt and pulleys 23 to a speed reducer 24 which is connected to said main shaft. A spur gear 25 on shaft 17 (Fig. 7) meshing with a rack 26 provides the reciprocatory movement to turret 8 by means of a pair of cam followers 27, mounted on a rack extension 28, which are in engagement with the periphery of the radial cam 29 mounted on drive shaft 21. The configuration of cam 29 is such that it imparts a cyclical movement to turret 8 through a quarter of a turn from the intake position shown in Fig. 1 to the discharge position shown in Fig. 4 and back.

During this quarter turn the pair of cartons received in slot 16 are held between the sides thereof and moved over a supporting surface 30 (Figs. 1, 3, 8). Two pairs of ridges or tracks 31, 32 project upwardly from surface 30 and extend along the arcuate path over which turret 8 moves the pair of cartons 1. The ridges of each pair are spaced apart slightly less than the width of a carton, and the pair 31 adjacent the inner end of slot 16 in turret 8 are formed to an arc concentric with shaft 17. The outer pair 32 are formed about an arc which diverges from tracks 31 in the direction of movement of the cartons from the intake position of Fig. 1 into the machine as shown in Fig. 3.

Since the filled milk cartons 1 are relatively heavy the ridges 31, 32 tend to make slight indentations in the bottoms thereof as shown in Fig. 8. Hence, when turret 8 swings to urge the pair of cartons along an arcuate path in side by side relationship the tracks 31, 32 will guide the cartons along slightly divergent paths. Upper rails 33, 34 (Figs. 1, 8), curved complementarily to tracks 31, 32 respectively, may be provided for engaging the upper ends of the cartons to assist in moving the cartons along the diverging paths of travel. As a result of this first step in the movement of the cartons the pair arrive at a position within the machine with their upper ends separated (Fig. 8) for insertion of the handle 3 therebetween.

The handle feeding mechanism, generally designated 10, is positioned at this point and comprises a handle blank magazine 37 (Fig. 1), a handle forming and feeding device 38, and a drive mechanism which will hereinafter be more fully described. The magazine 37 is open at the top and bottom and comprises a front channel member 39 (Figs. 9, 10) and a rear bar 40, extending upwardly from the housing and feeding mechanism, and adapted to receive a stack of handle blanks 41. The blanks are flat and horizontal and are adapted to be pushed one by one from the bottom of magazine 37 by a blade 42 mounted horizontally and coplanar with the bottom blank in the magazine are supported at their edges on a pair of opposed, elongated supported members 43 which extend from the magazine toward the feeding device 38.

Blade 42 projects forwardly from a pad 44 which is mounted for sliding movement and is reciprocated by a rod 45 which is adjustably connected to a generally vertically extending arm 46. Arm 46 is mounted on a shaft 47 which is oscillated by an arm-carried cam follower 48 which is held in yieldable engagement with the periphery of a radial cam 49 by means of a spring 50. Spring 50 pulls downwardly on a rod 51 which is hooked over an arm 52 secured to shaft 47 so as to urge follower 48 and arm 46 in a counterclockwise direction as seen in Fig. 9.

The greater portion of the periphery of cam 49 is formed concentric about the shaft 53 on which it is mounted, there being only a relatively short cut out portion 54 which allows arm 46 to swing rather rapidly to the left in Fig. 9 and then be returned to the rearmost position. Shaft 53 is driven by means of a sprocket 55 and chain 56 which may be driven by separate motor or by a sprocket (not shown) on the main drive shaft 21.

This swinging of arm 46 once during each revolution of cam 49 causes blade 42 to push the lowermost blank from magazine 37 toward handle feeding device 38. During this movement the handle blank slides under a pair of leaf springs 57 which are biased downwardly and positioned so as to force the tabs 5 (Fig. 15) downwardly from the finger holes of the blank 3 (Fig. 11) and into the path of a pair of stationary hooks 58. During this motion the central portion of the handle blank is supported on an elongated bar 59 positioned between the springs 57 and hooks 58. The hooks 58 catch tabs 5 and fold them back on the remainder of the handle blank as the latter is further urged into the awaiting jaws 60 of the handle feeding device 38.

Jaws 60 are in the form of a pair of horizontally extending plates secured to a head member 61 and spaced apart substantially the thickness of the handle blank 3 for receiving the same therebetween. The blade 42 urges the handle blank out of magazine 37, past springs 57 and hooks 58 and into the space between the awaiting jaws of feeding the device 38, as shown in Figs. 11 and 12.

Head member 61 is pivoted by a pin 62 to an arm 63 which is secured to a shaft 64 (Fig. 9) for swinging therewith. This swinging movement of shaft 64 and arm 63 is caused by an arm 65 secured to said shaft and provided with a cam follower 66 in engagement with the periphery of cam 49 (Figs. 9, 10). Follower 66 is held in engagement with cam 49 by a spring 67 which pulls downwardly on a rod 68 hooked over an arm 69 secured to shaft 64. The depressed portion 54 of cam 49 causes arm 63 to be swung downwardly and back once during each revolution of cam 49, in a manner similar to the movement of arm 46.

Head 61 is provided with an integral link 70 projecting therefrom in a direction opposite to the projection of jaws 60. At its outer end link 70 carries a cam follower 71 which rides in a stationary cam slot 72 (Figs. 9, 11, 12, 13). Slot 72 is formed somewhat like a question mark and controls the movement of the outer end of link 70 during the movement of head 61 by arm 63.

During the first portion of the downward swinging movement of arm 63, as caused by cam 49, follower 71 remains relatively stationary thereby causing head 61 and jaws 60 to be tipped slightly downwardly from the horizontal (Fig. 12). This movement causes the flap 4 on the bottom edge of handle blank 3 to be bent upwardly by the projecting end of bar 59. It will be noted that tabs 5 are undisturbed during this movement because they are spaced on opposite sides of bar 59. Further downward swinging of arm 63 causes further changing in the angle between said arm and head 61 and link 70, which move together, so that head 61 is tipped with jaws 60 to a substantially vertical position (Fig. 13).

At this point, the handle 3 is pushed between a pair of stationary folding members 75, 76 which catch the ends of tabs 4, 5, and bend the same back on the main body of handle 3. It will be understood that just prior to their movement between members 75, 76 jaws 60 are tipped slightly from the vertical position shown in Fig. 13 to assure tabs 5 being caught on member 75.

Handle 3 is now formed and further downward movement of head 61 and jaws 60 from the position shown in Fig. 13 inserts the lower end of said handle between the pair of cartons 1 which are positioned therebelow. Handle 3 is pushed down between the cartons to the extent that tabs 4 and 5 are positioned below the flanges 2 on said carton. The natural resiliency of said tabs causes the same to expand oppositely under flanges 2 and thereby holds the handle 3 against withdrawal by jaws 60, which complete their cycle by returning to the position of Figs. 9 and 11. In its final position handle 3 is received between the pair of cartons 1 with its tabs 4 and 5 engaging under the flanges 2 of said cartons.

It is obvious that if there are no cartons positioned below the handle feeding device 38 a handle 3 in jaws 60 may be returned to the upper position of Fig. 11. To avoid jamming a second handle against a handle in jaws 60 under such circumstances, a safety stop rod 77 (Figs. 9, 10) has been provided which engages the under side of arm 52. When rod 77 is in the position shown it prevents the downward movement of arm 52 under the influence of spring 50 and thereby prevents the swinging of arm 46 and the feeding of the handle blanks by blade 42. A spring urged button 78 (Fig. 9) projects laterally from the lower end of stop rod 77 into the path of the cartons positioned by turret 8 under the handle feeding device 38. When turret 8 carries the cartons to the positions for insertion of the handle said cartons push button 78 inwardly and thereby displace rod 77 from its stop position under arm 52, thereby allowing the described movement of the handle feeding mechanism.

The next step in the assembly of the cartons with the band and handle unit comprises encircling the pair of cartons with the band 6 while moving the same from turret 8 to turret 9 as illustrated in Fig. 4. To perform this transfer operation the apparatus of this invention is provided with a pusher 79 (Fig. 1) supported for reciprocation between turrets 8 and 9 over a generally horizontal supporting surface 80 upon which the pair of cartons are adapted to slide.

Pusher 79 is in the form of plate or pad secured to a rack 81 (Fig. 1) which is supported for reciprocating movement parallel to the line between turrets 8 and 9. Rack 81 is in engagement with the teeth of a spur gear 82 (Fig. 22) mounted in a housing 83 (Figs. 1, 22) on a vertically extending shaft 84 projecting upwardly from the main housing 7 behind turret 9. At its lower end shaft 84 carries a spur gear 85 (Figs. 7, 22) which is in mesh with a rack 86 provided with an extension 87 (Figs. 6, 7). Mounted on extension 87 are a pair of spaced cam followers 88 which are in engagement with opposite sides of the periphery of a radial cam 89 mounted on the main drive shaft 21 (Figs. 5, 7). It will be obvious that cam 89 causes an oscillation of shaft 84 similar to that caused to shaft 17 by cam 29, as previously described.

A second pusher 90 (Figs. 1, 22) is associated with turret 9 and is carried by a rack 91 which is in mesh with gear 82 so as to be driven thereby in unison with rack 81. The supporting surface 80, previously described, not only extends between the turrets 8 and 9, under pusher 70, but is also provided with an arcuate portion 92 (Fig. 1), formed about the pivot point of turret 9 and a straight portion 93 extending outwardly of the apparatus from turret 9.

Turret 9 is formed similarly to turret 8 in that it provides a pair of side arms 94 defining a carton receiving slot therebetween, which arms are secured to a vertical shaft 95 about which turret 9 pivots. Shaft 95 carries a spur gear 96 (Figs. 7, 22) at its lower end in mesh with a rack 97 connected to a rack 98 (Fig. 7) which is in mesh with the gear 25 on the lower end of shaft 17 of turret 8. The oscillating movement imparted to turret 8 is therefore transferred to turret 9 through racks 98 and 97 to cause similar oscillation of turret 9, but in an opposite direction.

Pusher 90 is supported for reciprocation over portion 93 of the supporting surface 80 (Fig. 1) and is caused to move toward and away from shaft 95 of turret 9 at the same time as pusher 79, but in an opposite direction.

Assuming that the position of the turrets and pushers illustrated in Fig. 1 is the initial position, the first movement to take place will be the movement of pusher 79 and 90 in the direction of arrows 99 and 100, respectively. Pusher 90 will act to eject the pair of cartons from turret 9, as will be more fully described later, and pusher 79 will be retracted to a position behind the inner end of slot 16 of turret 8 and adjacent shaft 17.

At this time a pair of cartons 1 have been received in the slot 16 of turret 8 and the turret 8, 9 are ready to be moved in the direction of arrows 18 (Fig. 3).

The turrets 8, 9 continue their movement inwardly until they reach the position of Fig. 4 in which their carton receiving slots are aligned. Pusher 79 is positioned, at this point, behind the pair of cartons which are moved onto the supporting surface 80 by turret 8. This is the position which corresponds to the position of the cams 29, 89 illustrated in Figs. 6 and 7.

From this position it will be noted that the turrets remain in an aligned position while cam 89 directs the movement of pusher 79 outwardly of slot 16 of turret 8 in a direction noted by arrow 101 (Fig. 4). Cam 89 is at the same time, of course, causing the retraction of pusher 90 rearwardly to the position shown in Fig. 1. This movement of pusher 79 results in the transfer of the pair of cartons from turret 8 into the slot between the arms on turret 9.

During the next movement of cams 29, 89 pushers 79, 90 remain stationary while turrets 8, 9 are swung back in a direction of arrows 19 (Fig. 5) to their starting position illustrated in Fig. 1.

During the periods between movement of a pair of cartons from turret 8 to turret 9 by pusher 79, the individual band which is to form a collar 6 around the pair of cartons, is cut from a supply of strip material 104 (Fig. 1) and fed across the path of travel of said cartons by the band feeding device, generally designated 11. The banding material 104 may be provided in a form of a roll 105 of plain paper tape mounted on the side of housing 7 and extending over one or more idler rollers 106 and through an edge folding device or hemming device 107. Device 107 folds the opposite edges of the strip back over onto the strip itself so as to strengthen the band in a manner similar to that described in detail in copending application Serial No. 388,330 filed October 26, 1953, now U.S. Patent No. 2,815,626.

The strip 104 is then fed by a driver roller 108 and an idler roller 109 between a pair of cutting blades 110, 111 and into band supports 112, 113. Supports 112, 113 comprise a pair of upwardly opening U-shaped supports arranged on opposite sides of the path of travel of the cartons between the turrets and extending in a direction transversely thereof.

In order to urge the band through supports 112, 113 across surface 80, idler roller 109 is spring urged, as by springs 114 (Fig. 20), into engagement with the periphery of drive roller 108 so as to positively engage strip 104 therebetween. The drive for roller 108 is provided from drive shaft 21 (Fig. 17) which carries a worm 115 in mesh with a gear 116 secured to the lower end of a drive shaft 117. Shaft 117 is connected through a universal coupling 118 to a clutch mechanism generally designated 119, the upper half which is connected to the shaft 120 on which roller 108 is secured.

Roller 108 normally rotates continuously and the periphery thereof is of such a length that it feeds the correct length of band into supports 112, 113 during each revolution. At one point in its periphery roller 118 is formed with a cut out or flat portion 121 (Fig. 20) which will not frictionally engage and drive the strip of banding material. It will be noted that nuts 122 (Fig. 20) limit the movement of idler 109 toward roller 108 so that the former will not press the strip banding material into engagement with the flat 121. When flat 121 moves to a position opposite idler roller 109 the feeding of strip 104 into supports 112, 113 ceases momentarily.

At this time a lever trip 123 (Fig. 16), projecting downwardly from the lower side of roller 108, contacts one end of a lever 124, which is centrally pivoted by pins 125 (Fig. 19) to the housing 126 for shaft 120, and urges it downwardly against a compression spring 127 (Fig. 16). This action raises the other end of lever 124, on which a projection 128 engages in a recess 129 in a horizontally extending sleeve 130 secured to a rotatably mounted shaft 131. The movable cutting blade 110 is carried by the outer end of shaft 131 and is thereby swung across fixed blade 111 upon the rotation of shaft 131 by the lifting motion of projection 128 on sleeve 130.

It will be seen from Figs. 16 and 20 that blades 110, 111 extend upwardly on opposite sides of the path along which roller 108 feeds the strip of banding material. Hence, during the momentary pause in the band feeding blade 110 cuts a band of the correct length from the strip, which band is then extending across the path of travel between the turrets 8 and 9, and is resting in supports 112, 113 (Fig. 3).

As will be further explained, the pair of cartons in moving from turret 8 to turret 9 will pick up the band 6 and move it from supports 112, 113. Band drive roller 108 is timed so that this action takes place during the momentary pause in the band feeding operation when flat 121 is opposite idler roller 109. Further movement of drive roller 108 from this position causes a succeeding band to be fed into the supports as described.

It is obvious that if the preceding band is not removed from supports 112, 113, as in the case when no cartons are pushed across surface 90 by pusher 79, the succeeding band might become jammed in the supports. To obviate this problem the clutch mechanism 119 of Figs. 16, 18 provides a safety feature.

Clutch 119 includes a sleeve 132 which is secured to shaft 117. A lower clutch plate 133 (Fig. 16) is journalled on sleeve 132 and a corresponding upper clutch plate 134 is secured to the lower end of shaft 120 on which drive roller 108 is mounted. Clutch plates 133, 134 are separated by a space which is occupied by a dog 136. Plates 133, 134 are secured for movement together by a plurality of bolts 135 and a pin 137, extending through dog 136, pivotally mounts the same between said plates. Dog 136 is formed with a shoulder 138 (Fig. 18) which engages in a recess 139 in sleeve 132, thereby transmitting the continuous rotation of shaft 117 through sleeve 132, dog 136, pin 137, and clutch plate 134 to shaft 120.

A latch 140 (Fig. 18) is mounted on a pivot pin 141 and urged by spring 142 into engagement with the periphery of clutch plates 133, 134 in a position to engage a projection 143 on dog 136. It will be understood that in this position shown in Fig. 18, further movement of sleeve 132 in a direction of arrow 134 will cause latch 140 to disengage shoulder 138 of dog 136 from the recess 139 in sleeve 132. This disengagement prevents further transfer of the rotary motion of sleeve 132 to clutch plate 134 thereby disengaging the drive to shaft 120 and drive roller 108.

The control for this disengagement is provided by a push rod 145 which projects into the housing for clutch 119 and engages a lever arm 146 of latch 140. The other end of push rod 145 is provided with a pad 147 (Fig. 1) which is in a position to be engaged by a pair of cartons 1 as they are swung to the inner position under handle inserting mechanism 38 by turret 8. As the cartons are so moved by turret 8 they urge push rod 145 in a direction toward band feeding mechanism 11 thereby swinging latch 140 away from dog 136. It will be seen therefore that as long as successive pairs of cartons are moved onto surface 80 by turret 8 push rod 145 will at each interval move latch 140 to an inoperative position resulting in continual engagement of dog 136 with sleeve 132 and uninterrupted driving of the feed roller 108. In the event there is a failure to feed a pair of cartons into turret 8 resulting in a failure to engage pad 147 and push rod 145 at the correct time during the sequence, latch 140 will cause disengagement of the clutch mechanism 119 and prevent feeding of the succeeding band by drive roller 108.

As previously explained the band or collar 6 is cut to length and positioned extending between supports 112, 113 prior to the movement of pusher 79 away turret 8. Band 6 therefore extends across the path of travel of the cartons from turret 8 to turret 9 (Figs. 3, 4) and is pulled from supports 112, 113 by the movement of the pair of cartons 1 in a direction of arrow 101 (Fig. 4). Since the cartons are slightly separated upon first being transferred to supporting surface 80 by turret 8 the first incremental movement of pusher 79 causes the trailing carton to be urged against the leading carton and to tightly engage the handle 3 therebetween.

It has been found advisable to provide a plate 150 (Fig. 1) projecting outwardly from a slide member 151 which is slidably mounted on rack 81. A spring 152 connected between member 151 and pusher 79 tends to pull the plate 150 toward said pusher, which movement is limited when pusher 79 is at the end of its stroke adjacent shaft 17 so that the cartons will be freely movable between plate 150 and pusher 79 by turret 8. In moving away from turret 8 toward turret 9 pusher 79 urges the trailing carton in slot 16 toward the leading carton with the handle 3 tightly engaged therebetween, the pair of cartons thereafter being embraced between pusher 79 and plate 150.

The pair of cartons picks up the band 6 in moving across surface 80 between supports 112, 113 and said band is folded about three sides of the pair of cartons by the arms 94 of turret 9 as illustrated in Fig. 4. It will be understood that the height of arms 94 from surface 80 is substantially the same as the height of the band that is supported by supports 112, 113. In effect, the band 6 is pulled from the supports 112, 113 by the cartons moving in the direction of arrow 101 and is held against the lateral sides of the pair of cartons by arms 94 and against the leading side of the leading carton by the bottom of the slot formed by arms 94. Two free ends 153, 154 of the band 6 project outwardly of the slot of turret 9 as the pair of cartons are firmly seated therein by pusher 79. At this time the movement of turret 9 in the direction of arrow 19 (Fig. 5) is initiated and, it will be noted, pushers 79, 90 are in the position indicated in Fig. 1.

Turret 9 is provided with a pair of opposed folding fingers 155, 156 (Figs. 1, 5, 22) each pivotally mounted adjacent the outer side of each arm 94 and extending generally parallel thereto. The ends 157, 158 of fingers 155, 156 opposite the pivots are bent oppositedly inwardly so as to be directed toward the open end of the slot formed in turret 9 by arms 94. A pair of compression springs 159, 160 urge fingers 155, 156 oppositely outwardly from arms 94 so that ends 158, 159 clear the open end of the slot of turret 9 for entrance thereto by the pair of cartons.

Each of these fingers 155, 156 is provided near its pivoted end with a cam follower 161 (Fig. 22) mounted on a lever 162 eccentric to the pivot pin 163 on which each of the folding fingers is swingably mounted. Cam follower 161 is positioned to engage a cam surface 164 (Figs. 1, 22) formed on the rear side of pusher 90, when said pusher is in the retracted position illustrated in Fig. 1.

As turret 8 begins its swinging movement in a direction of arrow 19 (Fig. 5) the cam follower on finger 155 first engages cam surface 164 causing finger 155 to be swung inwardly toward arm 94 against the free end 153 of band 6. End 157 of finger 155 folds this band end 153 against the outer side of the outer carton in turret 9 as seen in Fig. 5. At the same time end 157 of finger 155 tends to hold the pair of cartons securely in the slot between arms 94 of said turret.

Further swinging of turret 9 toward the outgoing position swings the free end 154 of band 6, which is still projecting outwardly from the pair of cartons, across the glue fountain 165 of the gluing apparatus generally designated 12 (Fig. 1). In brief, hot liquid glue is caused to flow down the outside of fountain 165 which is wiped by the free end 154 of band 6 by this movement (Fig. 5).

It will be noted that glue is thereby applied to the inside of the end 154 of band 6 and thereafter the same is folded over the previously folded end 153 by finger 156. At this time the cam follower 161 connected to finger 156 engages the cam surface 164 (Fig. 1) on pusher 90 and causes finger 156 to swing toward the opposed finger 155. End 154 of band 6 is thereby held firmly in overlapping relation to end 154 by the portion 158 of finger 156 during the remainder of the swinging movement of turret 9 toward the outgoing position of Fig. 1. The length of time during which finger 156 holds the glued end 154 of the band 6 against the end 153 is sufficient for the glue to dry thereby securing the band 6 around the pair of cartons.

The details of glueing apparatus 12 are disclosed in Fig. 21 as including a glue pot or reservoir 166 for containing hot liquid glue. A heater 167 may be provided in the reservoir for maintaining the glue in liquid form. The reservoir 166 communicates through ports 168 with pump means, generally designated 169 including a longitudinal bore 170 which receives a screw type conveyor 171. The outer end of screw 171 is provided with a pulley 172 which may be driven through a belt 173 by a pulley 174 on a small motor 175.

Bore 170 communicates through a passageway 176 with fountain 165 which is in the form of a hollow tube projecting upwardly from reservoir 166. Screw 171 fits bore 170 sufficiently closely to pump glue from port 168 through passageway 176 and outwardly of the open upper end 177 of fountain 165. It has been found desirable to bevel end 177 of fountain 165 or otherwise provide a depression in said end so that the glue pumped outwardly thereof will tend to run down one portion of the outside of fountain 165.

In the apparatus of this invention fountain 165 is positioned at a height to be wiped by the inner side of end 154 of band 6 as previously described with reference to Fig. 5. The lower side of the bevel or depression of 177 is therefore positioned at a point at which the free end of the band strikes the fountain. It is also desirable, to provide a localized or spot application of the glue to the band, to provide a protuberance 178 on the outside of fountain 165 at the band height.

Below said protuberance a recess 179 may be formed in the top of reservoir 166 around fountain 165 to receive the glue which is continuously pumped out of the open upper end of said fountain and return the same to the interior of the reservoir through a drain hole 180. By virtue of this structure there is little opportunity for any appreciable amount of glue to solidify on the exposed fountain since the continuous flow of hot glue cleans as it drains back into the reservoir.

Once the end flaps 153, 154 of the band 6 have been securely glued around the upper ends of the pair of cartons 1 with the handle 3 positioned therebetween, and turret 9 has been moved to the exit position of Fig. 1, the remaining step in the method is performed by the pusher 90 moving in the direction of arrow 100 ejecting the carton unit 181 (Figs. 1, 23) from the apparatus of this invention. It will be understood that in moving away from shaft 95 pusher 90 removes cam surface 164 from engagement with cam followers 161 on the folding fingers 155, 156 to permit said fingers to return to the open position of Fig. 1.

The semi-automatic machine disclosed in Figs. 24 through 28 assembles the carton units by a method similar to that previously described and includes some of the devices and mechanisms of the automatic machine. The semi-automatic machine, generally designated 200, comprises a base frame and housing 201 upon which are mounted a carton receiving mechanism 202, band feeding apparatus 203, gluing apparatus 204, and carton assembling mechanism 205.

The carton receiver 202 comprises a pair of base plates 206, 207 (Fig. 25) hingedly connected together by a pin 208 and mounted for sliding along a pair of generally horizontally extending tracks 209, 210. The outer end of tracks 209, 210 slant downwardly slightly, as at 211 (Fig. 24) so that when these plates 206, 207 are in their outermost position shown in Figs. 24, 25 a slight angularity is maintained between them. Extending upwardly from plates 206, 207 are a pair of opposed channels 212, 213 which, along with base plates 206, 207 provide a pocket, open on one side, for receiving a pair of milk cartons 214, 215, shown in dotted line in Fig. 24.

It will be noted that carton 215 which is received on plate 207 is tilted slightly from the vertical so as to provide a space between the upper ends of the cartons when the receiving mechanism 202 is in the outer position shown. A pre-folded handle 216, similar to handle 3 of Fig. 15, may then be inserted by hand into this space between the upper ends of the cartons with the flaps or tabs on the handle engaging under the flanges of the carton as previously described.

The carton receiver 202 is moved along tracks 209, 210 toward the assembling mechanism 205 by means of a cable 219. Base plate 206 is connected to cable 219 intermediately the ends thereof by a connector 220 (Fig. 25) and said cable extends parallel to tracks 209, 210 in opposite directions from connector 220 and over a pair of pulleys 221, 222 (Fig. 24). From pulley 221 cable 219 extends over an idler pulley 223 and is secured to a foot pedal 224 near the lower end of frame 201. The other end of cable 219, after passing over pulley 222, is connected to a counter weight 225 which is slidably mounted in a tube 226.

It will be understood that pressing downwardly on foot pedal 224 pulls on cable 219 which urges the carton receiving mechanism 202 along tracks 209, 210 from its starting position of Fig. 24. During the first part of this movement base plate 207 in moving from the slanted portion 211 of the tracks onto the straight horizontal portion thereof straightens the carton 215 so as to pinch the handle 216 between the upper ends of the cartons. Channel 213 moves with the base plate 207 and the pair of cartons is thereby gripped between the two channels so as to hold the same securely in mechanism 202.

Counter weight 225 fits tube 226 relatively closely and the former is provided with a sealing ring 227 (Fig. 24) on its lower end. Tube 226 has a small orifice 228 formed in its lower end for permitting the escape of air from the lower end of said tube, as weight 225 descends, at a predetermined rate. In effect weight 225 is cushioned against the air pocket in the lower end of tube 226 so as to prevent too rapid a descent of weight 225 and thereby too rapid a withdrawal of the cartons by receiving mechanism 202.

A pair of upwardly opening band supports 229, 230, similar to supports 112, 113 are supported on opposite sides of cartons 209, 210 (Fig. 25). Said supports are for the purpose of supporting the band or collar, which is to extend around the upper ends of the cartons, by its free ends with its central portion extending transversely of the space between tracks 209, 210, and across the path of travel of the cartons in receiving mechanism 202. Supports 229, 230 are positioned to support the band near the upper ends of the pair of cartons 214, 215.

The band is fed into supports 229, 230 by the band feeding apparatus 203 from a supply roll 231 (Fig. 24) as in the previously described modification. A strip of plain banding material is pulled from roll 231 through a hemming device 232 (similar to hemming device 107) by a pair of feed rollers 233, 234 (Fig. 25). Rollers 233, 234 are similar in construction and function to rollers 108, 109 in that springs 235 (Fig. 25) urge the periphery of rollers 234 into yieldable engagement with the peripheral of roller 233. Roller 233 is driven by a hand crank 236 so that the band positioned between the rollers is fed past a pair of blades 237, 238 and into supports 229, 230 upon rotation of roller 233. Roller 233 is provided with a flat 239 on its periphery for temporarily interrupting the contact between rollers 233 and 234 and thereby the feeding of the band.

As in the case of the previously described blades 110, 111, blade 237 is mounted for pivoting toward and away from fixed blade 238. Blades 237, 238 thereby act as a pair of scissors extending across the path of the band as it is fed from rollers 233, 234 to support 229. Blade 237 is mounted at the end of a rotatable shaft 240 (Fig. 26) to the periphery of which is connected a link 241 (Figs. 25, 26) having an upstanding flange 242 on its opposite end. A helical tension spring 243 (Fig. 25) yieldably urges link 241 in a direction to hold movable blade 237 spaced from fixed blade 238. A pin 244 projects downwardly from roller 233 into the path of the upstanding flange 242 so as to catch against the same once each revolution of roller 233.

As roller 233 is rotated past the position where pin 244 engages flange 242 the translation of link 241 caused thereby rotates shaft 240 so as to swing blade 237 across blade 238. The strip of banding material extending between the blades at that time is cut so that a correctly measured length of the same is supported in supports 229, 230. The relative position of pin 244 with respect to flat 239 is such that when the pin contacts flange 242 flat 239 is opposite roller 234, temporarily interrupting the feed of the banding material by said rollers. Thereafter the cut length of band is removed from supports 229, 230 and wrapped around the cartons, as will be more fully explained.

Pin 244 is slidable vertically in a bushing in roller 233 and is urged downwardly into a position for engaging flange 242 by a compression spring 245 (Fig. 26). The upper end of pin 244 is connected to the crank 246 which connects handle 236 to roller 233. Crank 246 is preferably formed of a springy material so that lifting on handle 236 will lift pin 244 for disengaging flange 242. Hence, the operator makes one revolution with handle 236 at the end of which 244 engages flange 242 so that blade 237 cuts the correct band length. The initiation of the feeding of the next succeeding band is accomplished by lifting handle 236 so as to disengage pin 244 from flange 242 for the next succeeding rotation of roller 233.

Once the band is in position in supports 229, 230 extending across tracks 209, 210 the cartons 214, 215 in receiving mechanism 202 are transported thereby across the band by pressing foot lever 224 (Fig. 24). As previously explained, in moving along tracks 209, 210 base plate 207 is first lifted from its tilted position to a position coplanar with base plate 206 so as to urge the upper end of carton 215 against carton 214 with the handle 216 wedged tightly therebetweeen.

Further movement of receiving mechanism 202 transfers the cartons across the space between the band supports 229, 230 and carries the band with the cartons between a pair of generally horizontal guides 247, 248 (Fig. 25). Guides 247, 248 extend parallel to tracks 209, 210 and are spaced apart substantially the width of a carton and at a height equal to the band supports 229, 230. Hence, as the cartons 214, 215 are moved, carrying the band with them, into the space between guides 247, 248 said band will be held by said guides against opposite sides of the pair of cartons and also against the leading side of the carton 214. By this movement the band is, in effect, wrapped around three sides of the pair of cartons.

Positioned adjacent the inner end of band support 229 is the glue fountain 251 of the gluing apparatus 204. Fountain 251 and the gluing apparatus 204 are similar in all respects to the previously described fountain 165 and gluing apparatus 12. As the free end of the band is pulled by the cartons out of band support 229 it is wiped past fountain 251 and picks up glue on the side which will be folded adjacent the cartons during a later operation. The free end of the band pulled from support 230 will, of course, extend outwardly of the cartons in the general direction of the extension of guide 247.

Positioned on opposite sides outwardly of guides 247, 248 are a pair of folding arms 252, 253 mounted for swinging on a pair of vertical shafts 254, 255 (Fig. 25). At their ends opposite shafts 254, 255 arms 252, 253 are provided with oppositely inwardly directed folding fingers 256, 257 which are adapted to swing across the outer ends of guides 247, 248 upon swinging of arms 252, 253.

Near the inner end of tracks 209, 210 and extending between guides 247, 248 is a carton stop 258 (Fig. 25) against which the pair of cartons is urged by the carton receiving and transfer mechanism 202. Stop 258 is positioned at a point substantially the width of a pair of cartons from the outer end of guides 247, 248 so that when said cartons are adjacent said stop the outer side of the trailing carton is adjacent the outer end of the guides 247, 248.

A pair of dogs 259, 260 project oppositely inwardly from shafts 254, 255, respectively, at a position under tracks 209, 210 and generally below the carton stop 258. Dog 260 is secured to the lower end of shaft 255 whereas dog 259 (Figs. 27, 28), is rotatably mounted on the lower end of shaft 254 and is connected by a spring 261 to a lever 262 which is secured to shaft 254. Both dogs 259, 260 are provided for swinging arms 252, 253, the spring 261 providing a yieldability in the connection between dog 259, and shaft 254.

It will be noted that dog 259, which controls arms 252 extends forwardly of the tracks 209, 210 ahead of dog 260, which controls arm 253. As the pair of cartons with the band wrapped around three sides thereof is pulled along the tracks by the mechanism 202 a ring 263 (Fig. 24) on the cable connector 220 first contacts dog 259 causing arm 252 to be swung inwardly toward track 210. The finger 256 on the outer end of arm 252 is thereby caused to fold the projecting free end of the band over the fourth side of the carton positioned on base plate 207.

Further movement of carton receiving mechanism 202 causes ring 263 to engage dog 260 thereby swinging arm 253 inwardly toward arm 252. This action causes finger 257 on arm 253 to fold the remaining band end, to the inside of which glue has been applied by fountain 251, into an overlying position with the first folded band end. Spring 261 allows for the overtravel of dog 259 caused by this latter movement.

At this time, the cartons are positioned adjacent stop 258 and finger 257 serves to hold the band ends in position folded around the fourth side of the pair of cartons for a sufficient length of time for the glue to set. This completes the unitization of a pair of cartons into an assembly with the band and handle as shown in Fig. 23.

As previously explained, release of the foot pedal 224 allows the counterweight 225 (Fig. 24) to return the carton receiving mechanism 202 to its initial position. Prior to this action arms 252, 253 are returned to their outer positions by the action of springs 264 (Figs. 24, 27), which are connected between the frame 201 and levers 265 projecting from each of the shafts 254, 255. After arms 252, 253 have opened and the carton assembly has been returned to the initial position of receiving mechanism 202 the grip on said assembly is released by the tilting of base plate 207 on the slanted end of tracks 209, 210.

The carton assembly may now be easily removed from the receiving mechanism 202 by grasping the handle 216, and receiving mechanism 202 again charged with a pair of separate cartons for repeating the process. It will be understood that after an operator has acquired some experience in using the semi-automatic machine 200, the method of assembling the cartons may well become almost continuous and therefore provide many of the advantages of fully automatic machinery at less than the normal cost.

Although the invention has been described and illustrated in detail it is obvious that modifications could be made therein without departing from the spirit and scope of the invention.

I claim:

1. A method of packaging a pair of upright rectangular cartons as a unit comprising the steps of: moving a pair of said cartons in side by side relationship along a first pair of diverging paths of travel for separating the upper ends of said pair, inserting the lower end of a handle between said upper ends while the same are so separated, moving one of said cartons toward the other against said handle and continuing moving said pair of cartons together in tandem relationship, with said handle therebetween, in the same direction along a second path of travel, and during movement of said cartons along said second path, wrapping a band around three sides of said pair of cartons, moving said cartons together in side by side relationship along a third path of travel, and at the same time wrapping the ends of the bands around the fourth side of said pair and securing said ends together for holding said cartons and said handle together.

2. Apparatus for packaging a pair of upright rectangular cartons as a unit, comprising: a pair of swingably mounted turrets having open-ended, elongated, carton receiving slots therein for receiving a pair of cartons, said turrets being movable from first positions in which the slots extend in a generally parallel, spaced relation to second positions in which said slots are aligned with their open ends directed toward each other, means supporting the pair of cartons in the slot of one of said turrets for guiding said cartons along slightly divergent paths of travel during movement of said one turret from said first to said second position for separating said cartons, a handle feeding device positioned over said one turret at said second position and operative to insert a handle between the upper ends of said pair of cartons so separated, pusher means mounted for reciprocatory movement along said slots in said second positions for urging said cartons together and for transferring said cartons from the slot of said one turret to the slot of the other of said turrets, means for supporting an elongated band by its ends with its central portion extending across the open ends of said slots in said second positions, whereby said band will encircle three sides of said pair of cartons during said transfer, and means carried by said other turret for folding the ends of said band over each other on the fourth side of said pair of cartons.

3. Apparatus for packaging a pair of upright rectangular cartons as a unit, comprising: a pair of swingably mounted turrets having open-ended, elongated, carton receiving slots therein for receiving a pair of cartons, said turrets being movable from first positions in which the slots extend in a generally parallel, spaced relation to second positions in which said slots are aligned with their open ends directed toward each other, means supporting the pair of cartons in the slot of one of said turrets for guiding said cartons along slightly divergent paths of travel during movement of said one turret from said first to said second position for separating said cartons, a handle feeding device positioned over said one turret at said second position and operative to insert a handle between the upper ends of said pair of cartons so separated, pusher means mounted for reciprocatory movement along said slots in said second positions for urging said cartons together and for transferring said cartons from the slot of said one turret to the slot of the other of said turrets, means for supporting an elongated band by its ends with its central portion extending across the open ends of said slots in said second positions, whereby said band will encircle three sides of said pair of cartons during said transfer, means carried by said other turret for folding the ends of said band over each other on the fourth side of said pair of cartons, and means positioned adjacent the open end of the slot in said other turret for applying adhesive to the ends of said band.

4. Apparatus for packaging a pair of upright, rectangular cartons as a unit, comprising: a slidably mounted carton transfer device having an open-sided pocket for receiving a pair of cartons therein, one portion of said pocket being tiltable with respect to the other portion, an elongated track on which said device is mounted for movement from a first position to a second position, means on said track permitting tilting of said one portion of said pocket at said first position for tilting the carton received therein for separating the upper ends of said cartons, means for supporting an elongated band by its ends with its central portion extending across said track whereby said band will encircle three sides of said pair of cartons during movement thereof from said first to said second position, and means mounted for movement transversely of said track for folding the ends of said band over each other on the fourth side of said pair of cartons.

5. In a machine for securing an elongated band around an article, apparatus for applying a liquid adhesive material to a free end of said band, comprising: a reservoir for containing a supply of said adhesive, a hollow fountain projecting vertically upwardly from said reservoir and having an opening at the upper end thereof for discharging said adhesive therefrom to flow down the outside surface of said fountain, and pump means connected between said reservoir and the hollow interior of said fountain for pumping said adhesive out of said opening whereby said free end of said band will pick up adhesive upon being wiped across said outside surface of said fountain.

6. In a machine for securing an elongated band around an article, apparatus for applying a liquid adhesive material to a free end of said band, comprising: a reservoir for containing a supply of said adhesive, a hollow fountain projecting vertically upwardly from said reservoir and having an opening at the upper end thereof for discharging said adhesive therefrom to flow down the outside surface of said fountain, pump means connected between said reservoir and the hollow interior of said fountain for pumping said adhesive out of said opening whereby said free end of said band will pick up adhesive upon being wiped across said outside surface of said fountain, and drain means at the lower end of said fountain communicating with said reservoir for collecting the adhesive flowing down said fountain and returning the same to said reservoir.

7. In a machine for securing an elongated band around an article, apparatus for applying a liquid adhesive material to a free end of said band, comprising: a reservoir for containing a supply of said adhesive, a hollow fountain projecting vertically upwardly from said reservoir and having an opening at the upper end thereof for discharging said adhesive therefrom to flow down the outside surface of said fountain, pump means connected between said reservoir and the hollow interior of said fountain for pumping said adhesive out of said opening whereby said free end of said band will pick up adhesive upon being wiped across said outside surface of said fountain, and a protuberance on said outside surface of said fountain providing a localized area for spot application of said adhesive to said band.

References Cited in the file of this patent

UNITED STATES PATENTS

| | | |
|---|---|---|
| 1,760,615 | Wheeler | May 27, 1930 |
| 2,109,527 | Fenton | Mar. 1, 1938 |
| 2,615,289 | Hickin | Oct. 28, 1952 |
| 2,766,567 | Fahrenbach | Oct. 16, 1956 |